(12) United States Patent
Kim et al.

(10) Patent No.: US 8,358,303 B2
(45) Date of Patent: Jan. 22, 2013

(54) METHOD OF SEARCHING NEIGHBORING CELL ADDRESS IN SAME RESOLUTION OCTREE STRUCTURE

(75) Inventors: Jae-Woong Kim, Seoul (KR); Suk-Han Lee, Gyeonggi-do (KR)

(73) Assignee: Sungkyunkwan University Foundation for Corporate Collaboration (KR)

( * ) Notice: Subject to any disclaimer, the term of this patent is extended or adjusted under 35 U.S.C. 154(b) by 607 days.

(21) Appl. No.: 12/361,412

(22) Filed: Jan. 28, 2009

(65) Prior Publication Data

US 2009/0198890 A1 Aug. 6, 2009

(30) Foreign Application Priority Data

Jan. 31, 2008 (KR) .......................... 10-2008-0010298

(51) Int. Cl.
*G06T 17/00* (2006.01)
*G06T 15/00* (2011.01)

(52) U.S. Cl. .......................... 345/420; 345/419; 345/424

(58) Field of Classification Search .......................... None
See application file for complete search history.

(56) References Cited

U.S. PATENT DOCUMENTS

2003/0218606 A1* 11/2003 Zhirkov et al. ............... 345/419

OTHER PUBLICATIONS

P. Bhattacharya, Efficient Neighbor Finding Algorithms in Quadtree and Octree, Master Thesis, Indian Institute of Technology, Kanpur, 2001.*
Djaffer Ibaroudene, Victor Demjanenko, and Raj S. Acharya. 1990. Adjacency algorithms for linear octree nodes. Image Vision Comput. 8, 2 (May 1990), 115-123.*
Mccool, M.D.;, "Signal Processing and General-Purpose Computing and GPUs [Exploratory DSP]," Signal Processing Magazine, IEEE , vol. 24, No. 3, pp. 109-114, May 2007.*

* cited by examiner

*Primary Examiner* — Kee M Tung
*Assistant Examiner* — Zhengxi Liu
(74) *Attorney, Agent, or Firm* — James P. Muraff; Neal, Gerber & Eisenberg LLP

(57) ABSTRACT

Disclosed is a method of searing an address in the octree structure having the same resolution. The method of searching address values of the neighboring cells in the octree structure having the same resolution can include performing address encoding of octree cells by giving an inherent address value that is increased according to a depth level of octree to each cell in the octree structure such that address difference values of neighboring cells in the octree structure has a sequential rule; and searching an address value of a neighboring cell that is in contact by a surface with the selected octree cell by using the sequential rule of the address-encoded address difference value of each octree cell. In accordance with an embodiment of the present invention, it is possible to efficiently search address values of neighboring cells that are in contact with an octree cell.

8 Claims, 10 Drawing Sheets

PRIOR ART (a) Difference of address value of cells in x-axis per level (b) Difference of address value of cells in y-axis per level (c) Difference of address value of cells in z-axis per level FIG. 10
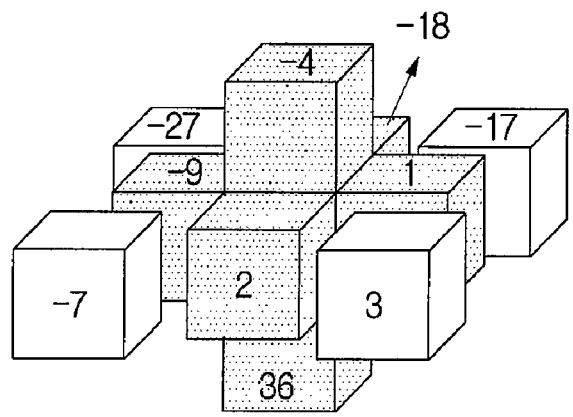
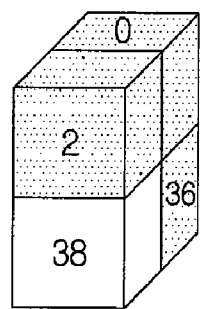
2 connection model
y + z = 2 + 36 = 38
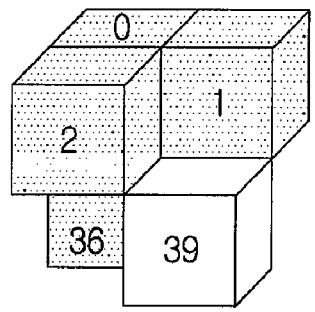
3 connection model
x + y + z = 1 + 2 + 36 = 39
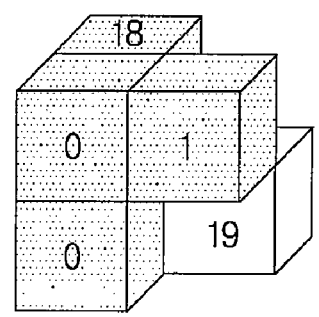
3 connection model
x - y + z = 1 - 18 + 36 = 19

METHOD OF SEARCHING NEIGHBORING CELL ADDRESS IN SAME RESOLUTION OCTREE STRUCTURE

CROSS-REFERENCE TO RELATED APPLICATIONS

This application claims the benefit of Korean Patent Application No. 10-2008-0010298 filed with the Korean Intellectual Property Office on Jan. 31, 2008, the disclosure of which is incorporated herein by reference in its entirety.

BACKGROUND

1. Technical Field

The present invention relates to a method of searching a neighboring cell address in a same resolution octree structure, more specifically to a method of quickly and simply address searching values of neighboring cells having same sizes (or resolutions) about a selected cell in an octree structure.

2. Description of the Related Art

For a basic understanding of the subject matter of the present invention, reference is hereby made to the terms Data Structure, Programming Language and Computer as defined by The Wikipedia Encyclopedia, definitions of which are hereby incorporated by reference.

Typically, an octree is one of the tree data structures that are popular due to easy and simple use.

As shown in FIG. 1, the typical octree structure gives an address by assigning zero and positive integers of 1 through 7 from a lower left rear corner before performing the encoding. The typical octree structure is usable for any data that can be represented in the form of having 3 orthogonal axes. Accordingly, the typical octree structure can be used in the fields of computer graphics, computer vision, and robotics, which represent database data in a space having 3 orthogonal axes or which represent an actual circumstance based on a reference point by using 3 orthogonal axes.

Especially, in the database field, the octree structure is used when the clustering is used based on the grid. The octree structure is also used in the fields of graphics or vision when an object in the 3-dimensional space is rendered or modeled.

Many studies follow the octree structure, and especially, many efforts are made to search neighboring cells.

It is very important to find out the neighborship between generated cells in the octree structure in order to group data. Moreover, recognizing the neighborship is very important for the probable modeling of a 3-dimensional object in the fields of computer vision and robotics and studies on job circumstances.

For example, the octree structure is very useful to a factor constituting one object by using the connection of a plurality of scattered cells having various resolutions that in the modeling field. The octree structure can be also efficiently used by searching a free space for a robot in a work space considering movement to plan a path for avoidance or working and to generate a map.

On the other hand, the work space modeling and the planning of available paths or motions has very important effects on the performance of a robot in driving and manipulating of the robot. In other words, it should be firstly considered how fast a plan for available paths or motions is made.

In the case of the field of robots that projects and uses a 3-dimensional space, however, there always have been inherent errors of 3-dimensional points and there may be uncompleted data having forms that can not be recognized. The method of addresses of neighboring cells in the octree structure is mainly used to overcome the problems in analyzing a space in the 3-dimensional space having errors.

Information related to octree cells is very important in the process of searching the addresses of the neighboring cells. It is because one cell can become a 3-dimensional space and the cell can include a variety of information. Accordingly, it is required to recognize the neighborship between all or some of cells in order to plan a path or define an object and to be used for the studies to understand the space.

Thus, it becomes important to study how the cells are searched, where the cells are located, and how the cells are connected to each other. However, it should be firstly considered to search the neighborship of a selected cell.

According to the typical method of searching an address of a neighboring cell suggested by H. Samet [The Design and Analysis of Spatial Data Structures Reading, Mass.: Addison-Wesley, 1990.], which is incorporated by reference in its entirety herein, the address value of the neighboring cell is computed in the circumstance having a direction for a pointer octree and a common ancestor is searched before an algorithm starts.

This method can analyze a tree structure until a common ancestor is found, but the method has no solution when there is no neighboring cell. This algorithm is re-studied by J. E. Besanon [J. E. Besangon, Vision par Ordinateur en Deux et Trois Dimensions. Paris, France: Eyrolles, 1988, pp. 341-353]. The method of encoding an octree address is additionally studied.

Then, the backtracking method in the octree structure, which is suggested by D. H. Ballard and C. M. Brown [D. H. Ballard and C. M. Brown, Computer Vision. Englewood Cliffs, N.J.: Prentice-Hall, 1982], which is incorporated by reference in its entirety herein, back-tracks the generation process of the octree structure to the common parent. In the tree structure and design, this backtracking method is used for two selected cells. However, this method has no solution when two cells are in contact by the corner with each other.

SUMMARY

Accordingly, the present invention, which is contrived to solve the aforementioned problems, provides a method of searching a direct-neighboring cell address in an octree structure having a same resolution that can efficiently address values of 26 same-sized neighboring cells that are directly adjacent to a randomly selected octree cell by performing the address-encoding of each cell in the octree structure such that the difference between address values of the cells in the octree structure has a regular rule and by using the regular rule of the difference between the address values of each of the address-encoded cells.

In particular, the present invention provides a method of searching an address of a direct-neighboring cell in an octree structure having a same resolution that can evaluate address values of 6 neighboring cells that are in contact by the surfaces with a randomly selected octree cell by using a regular rule of the difference between address values of each cell in an octree structure and quickly and simply search the remaining 20 cells that are in contract by the lines and by the corners by using the difference values between the address values.

An aspect of the embodiment(s) features a method of searching an address value of a neighboring cell that is in contact with a randomly selected octree cell in an octree cell, including performing address encoding of octree cells by giving an inherent address value that is increased according to a depth level of octree to each cell in the octree structure such that address difference values of neighboring cells in the octree structure has a sequential rule; and searching an address value of a neighboring cell that is in contact by a surface with the selected octree cell by using the sequential rule of the address-encoded address difference value of each octree cell.

The method can further include searching an address value of a neighboring cell that is in contact by a line or a corner with the selected octree cell.

In the performing of the address encoding of octree cells, the address encoding can be performed by giving an address by assigning positive integers of 1 through 8 from an upper left rear corner of an octree cell and repeatedly increasing the number of digits according to the depth level of octree and adding a new digit at the end of an old address.

In the performing of the address encoding of octree cells, the address encoding can be performed by a method that increases the depth level of octree by maximizing the size of a first octree cell and continuously dividing the cell into smaller cells.

In the performing of the address encoding of octree cells, the address encoding can be performed by using an octree coordinate system having an origin which is a center of gravity of an octree cell and an x-axis in left and right directions, a y-axis in upper and lower directions, and a z-axis in front and rear directions such that the addresses values given to the neighboring cells in the octree structure have directions based on the x, y, z axes of the octree coordinate system.

For an octree coordinate system having an origin which is a center of gravity of an octree cell and an x-axis in left and right directions, a y-axis in upper and lower directions, and a z-axis in front and rear directions, the sequential rule of address difference values of neighboring cells in the octree structure can have a pattern of increase or decrease value that pertains to one of a set of increase or decrease values of address difference values of cells in an x-axis direction, $\{\pm1, \pm9, \pm89, \pm889, \pm8889, \ldots\}$; a set of increase or decrease values of address difference values of cells in a y-axis direction, $\{\pm4, \pm36, \pm356, \pm3556, \pm35556, \ldots\}$; and a set of increase or decrease values of address difference values of cells in a z-axis direction, $\{\pm2, \pm18, \pm178, \pm1778, \pm17778, \ldots\}$. Here, a positive value can indicate an increase direction of each axis, and a negative value indicates a decrease direction of each axis The increase or decrease values $a_{n+1}$ of address difference values are generalized as $a_{n+1} = \pm(a_n + R_n)$, $R_n = 8 \times a_0 \times 10^n$.

Here, $a_0$, which is an initial value of the increase or decrease values of address difference values, can have 1 in the x-axis, 4 in the y-axis, and 2 in the z-axis, n, which is a maximum length of the neighboring cells being arranged in a line in each axis direction, ranges between 0 and a maximum depth level of octree.

The searching of the address value of a neighboring cell can be performed by using a sequential rule that a summation of address values of two octree cells that are located opposite to each other about each of the x-, y-, and z-axes from a center in the octree coordinate system is regular.

The searching of the address value of a neighboring cell can be performed by using 4 basic rules, for determining whether an address value of a neighboring cell is effective, and an effective figure table of opposite cell that stores an effective figure capable of regularly replacing an address value of an octree cell located at an opposite point. Here, the 4 basic rules can include a first condition, using positive integers of 1 through 8 for address-encoding; a second condition, requiring that lengths of addresses are identical to each other; a third condition, requiring that figures in the last digits are not identical to each other; and a fourth condition, requiring that figures in the effective figure table is available for each digit of addresses, and the effective figure table can be created as the following table

| FIG. | all | x | y | x |
|------|-----|---|---|---|
| 1 | 1 | 2 | 5 | 3 |
| 2 | 2 | 1 | 6 | 4 |
| 3 | 3 | 4 | 7 | 1 |
| 4 | 4 | 3 | 8 | 2 |
| 5 | 5 | 6 | 1 | 7 |
| 6 | 6 | 5 | 2 | 8 |
| 7 | 7 | 8 | 3 | 5 |
| 8 | 8 | 7 | 4 | 6 |

In the searching of the address value of a neighboring cell, the searching of address values of neighboring cells that are in contact by surfaces of 6 directions of the octree coordinate system can be performed by normalizing a difference value between address values of the selected octree cell and a cell that is opposite to the selected octree cell as a coordinate value from the center of the octree coordinate system.

In the searching of the address value of a neighboring cell, the searching of address values of neighboring cells that are in contact by 6 surfaces can be performed by obtaining an address difference value of 6 directions of the octree coordinate system by use of a sequential rule of the normalized address difference value and a maximum normalized address difference value that can be obtained from a pertinent level of octree level.

BRIEF DESCRIPTION OF THE DRAWINGS

FIG. 10 is an example showing how address values of 20 neighboring cells that are in contact by the lines and the corners are generated.

DETAIL DESCRIPTION

The description that follows describes, illustrates and exemplifies one or more particular embodiments of the present invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the present invention is intended to cover all such embodiments that may fall within the scope of the appended claims, either literally or under the doctrine of equivalents.

Firstly, prior to the description of the embodiment(s) of the present invention, when an octree structure includes cells having same sizes (or resolutions), there is a structure having 6 cells that are in contact by the surfaces with a cell, 12 cells that are in contact by the lines with the cell, and 8 cells that are in contact by the corners with the cell. The structure is defined as the neighboring, and the cells that are in contact by the surfaces, lines or corners with the cell are referred to as neighboring cells. The quantitative difference between address values of two neighboring cells is defined as an address difference value. The 6 cells that are in contact by the surfaces with a randomly selected cell in x, y, and z-axis directions are defined as 6 fundamental neighboring cells. In addition, two cells that are symmetrically located about each axis are referred to as an opposite or mirroring pair.

Moreover, an address search method according to an embodiment of the present invention can be executed by a video or graphic processor which processes video or graphic data. Especially, the address search method according to an embodiment of the present invention can be preferably executed by the video or graphic processor which is mounted in a system including an address generator, encoding an address; a shared memory, storing video or graphic data; and a high-speed data bus, connecting all elements such as the processor, the address generator, and the shared memory.

Figure 1:
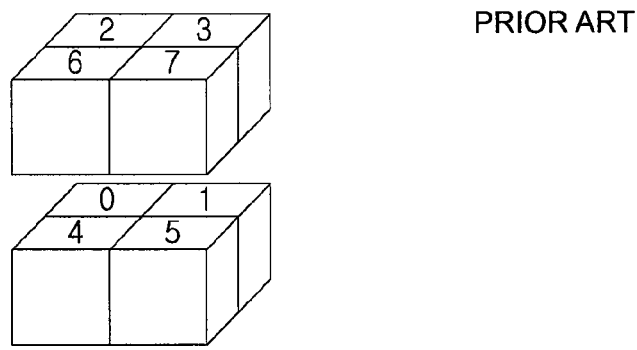
FIG. 1 shows a cell at a depth level 1 to describe an address encoding method of a typical octree structure.
Figure 2:
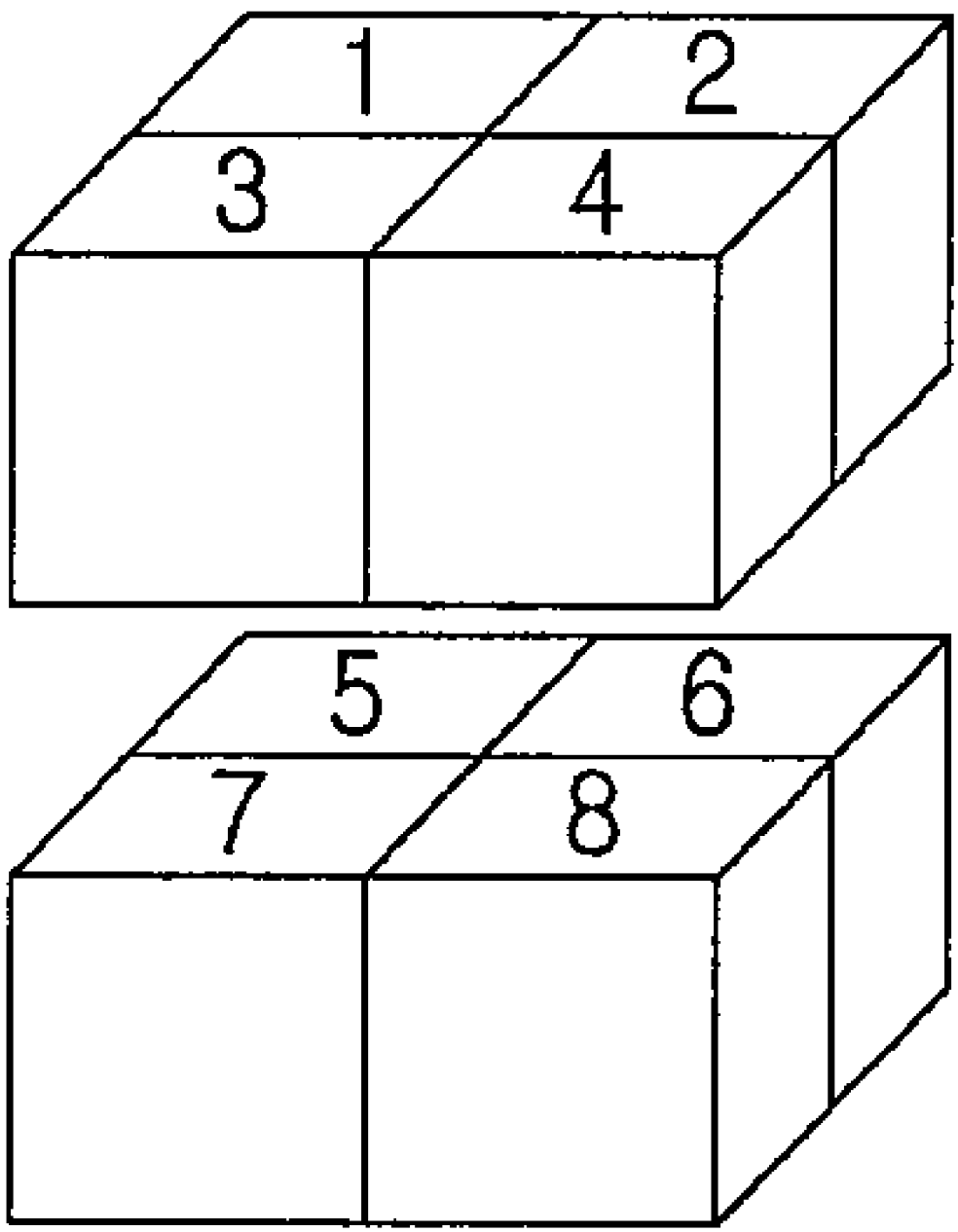
FIG. 2 shows a cell at a depth level 1 to describe an address encoding method according to an embodiment of the present invention.
Figure 3:
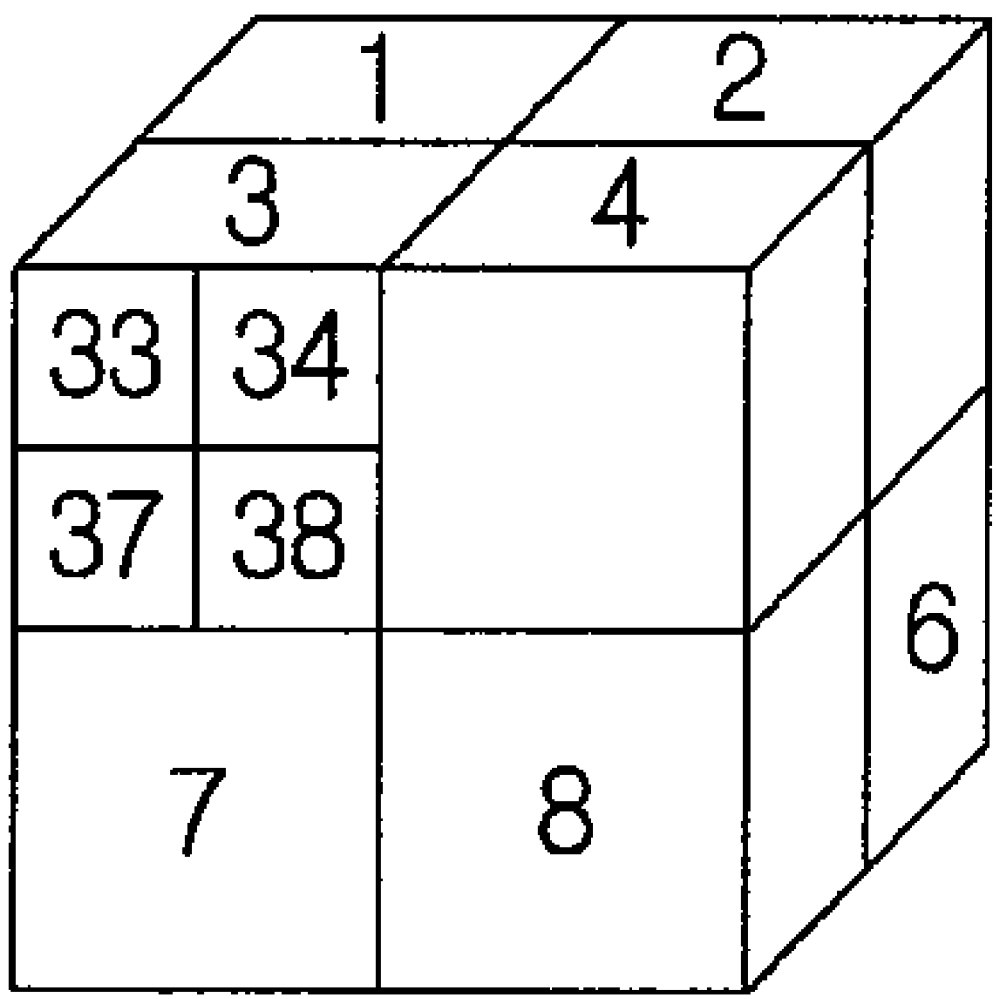
FIG. 3 shows a cell at a depth level that is increased to 2 to describe an address encoding method according to an embodiment of the present invention.
Figure 4:
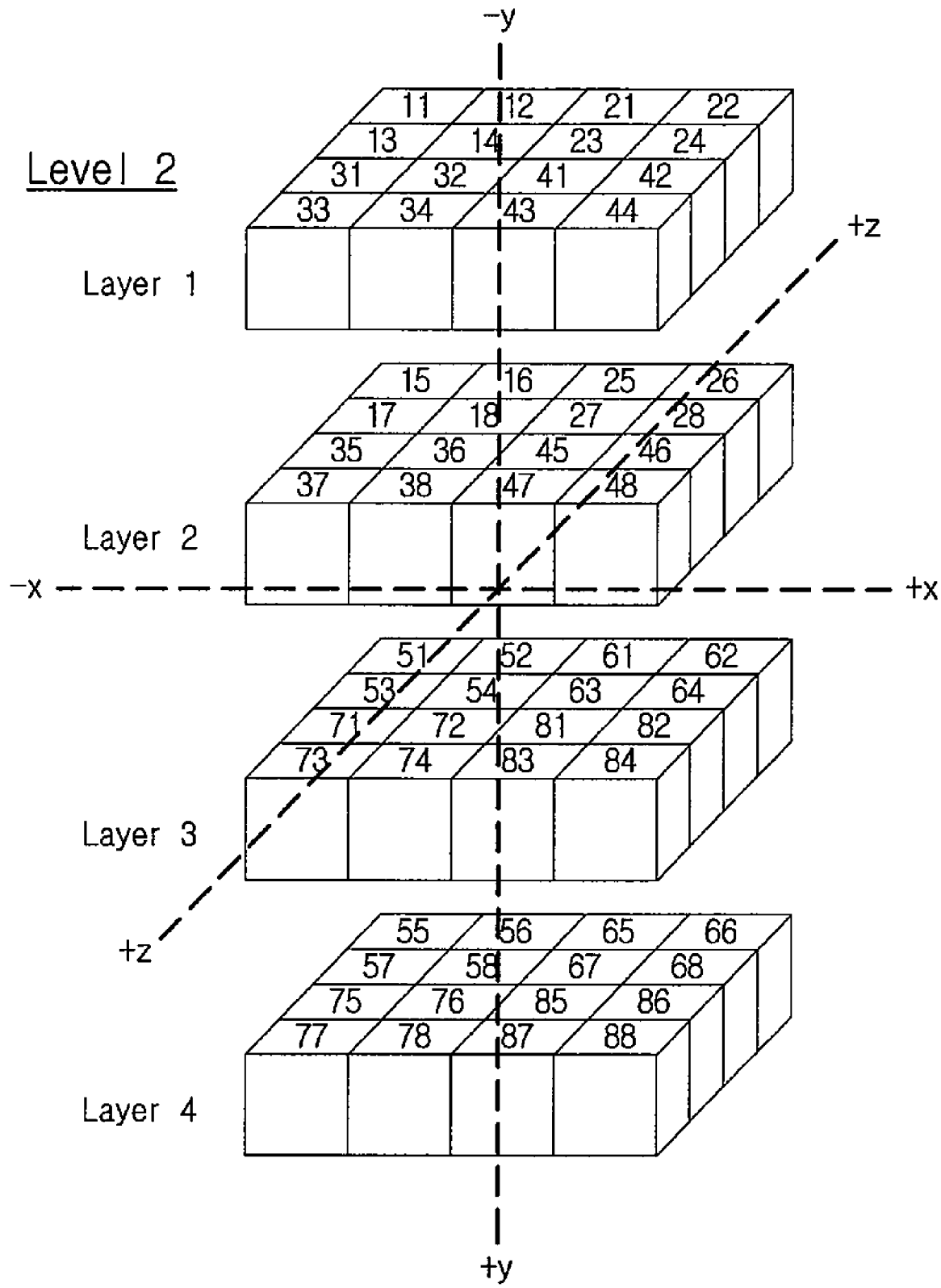
FIG. 4 separately shows the layers of an octree cell at a depth level 2 that has been address-encoded in an address search method according to an embodiment of the present invention.

FIG. 2 shows a cell at a depth level 1 to describe an address encoding method according to an embodiment of the present invention, and FIG. 3 shows a cell at a depth level that is increased to 2 to describe an address encoding method according to an embodiment of the present invention. FIG. 4 separately shows the layers of an octree cell at a depth level 2 that has been address-encoded in an address search method according to an embodiment of the present invention.

As shown in FIG. 2, the address encoding method according to an embodiment of the present invention can give an address by assigning positive integers of 1 through 8 from an upper left rear corner of an octree cell.

In case that the depth level of the octree cell is increased to 2, it is possible to increase the octree depth level by maximizing the size of a first octree cell and continuously dividing the cell into smaller cells as shown in FIG. 3 and FIG. 4. That is, the address encoding method in accordance with an embodiment of the present invention can be executed by repeatedly increasing the number of digits according to the depth level of octree and adding a new digit at the end of an old address.

For example, when the depth level is 1, the address value can have one digit. When the depth level is 2, the address value can have two digits. As a result, the address encoding method according to the embodiment of the present invention can give an inherent address value having the digit that is increased according to the octree depth level to each cell in the octree structure. Moreover, the address difference value between neighboring cells in the octree structure can show a regular sequential rule.

Here, the sequential rule is described because the address difference values evaluated by the address encoding according to an embodiment of the present invention are represented as a sequence having the complex difference of the increase or the decrease, instead of being simply represented as a geometric sequence having a regular common ratio or an arithmetic sequence having a regular common difference The address search method according to an embodiment of the present invention, as shown in FIG. 4, can employ an octree coordinate system, the origin of which is the center of gravity of a first octree cell. For example, when the octree coordinate system has an x-axis in left and right directions, a y-axis in upper and lower directions, and a z-axis in front and rear directions, each of the addresses values given to the neighboring cells in the octree structure can have the directions based on the x, y, z axes of the octree coordinate system.

Figure 5:
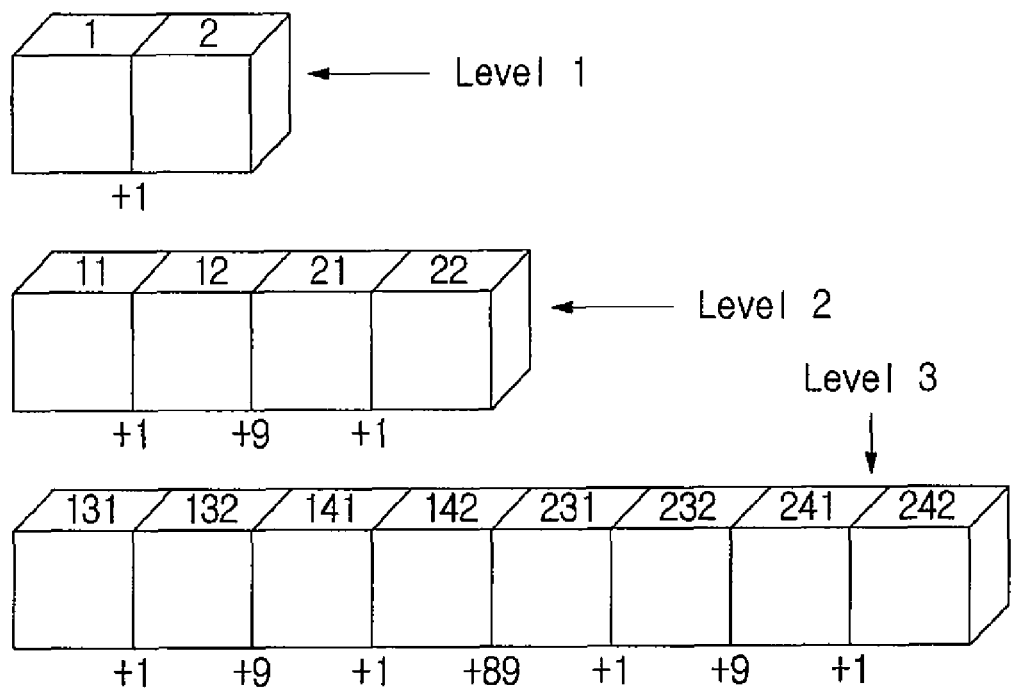
FIG. 5 shows the difference of the address values of neighboring cells in the x-axis per level in an octree structure to describe a sequential rule of the address difference value by an address encoding method according to an embodiment of the present invention.
Figure 6:
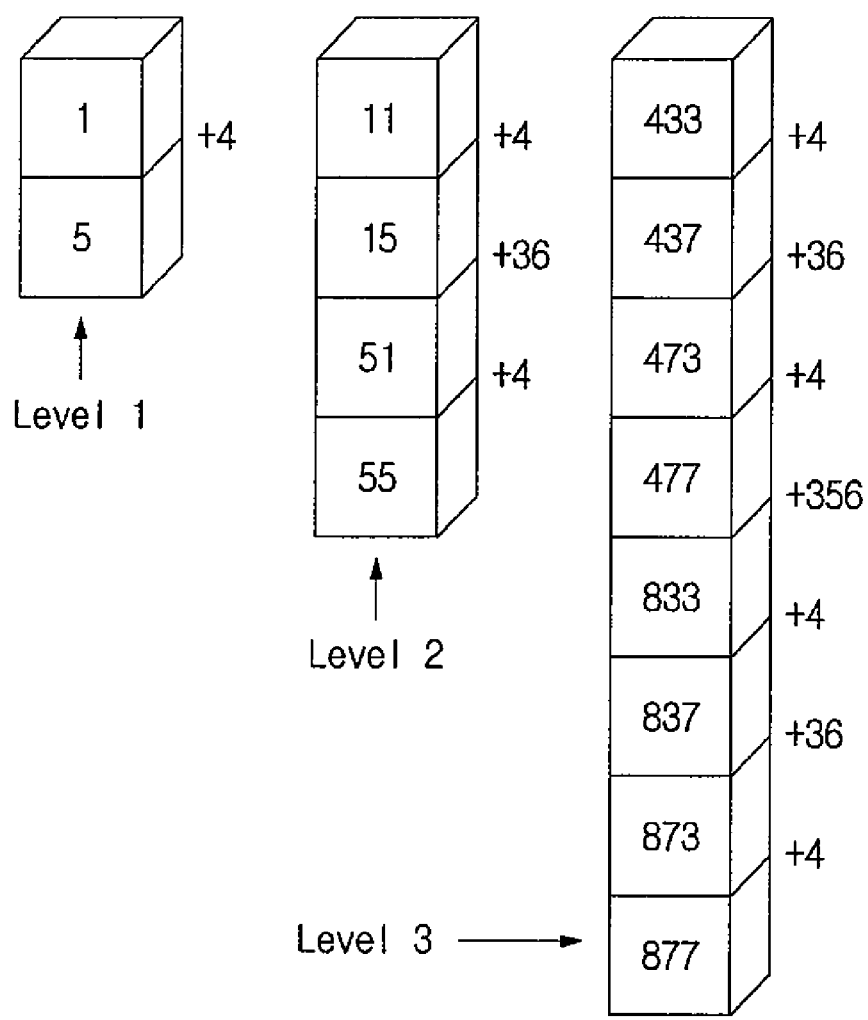
FIG. 6 shows the difference of the address values of neighboring cells in the y-axis per level in an octree structure to describe a sequential rule of the address difference value by an address encoding method according to an embodiment of the present invention.
Figure 7:
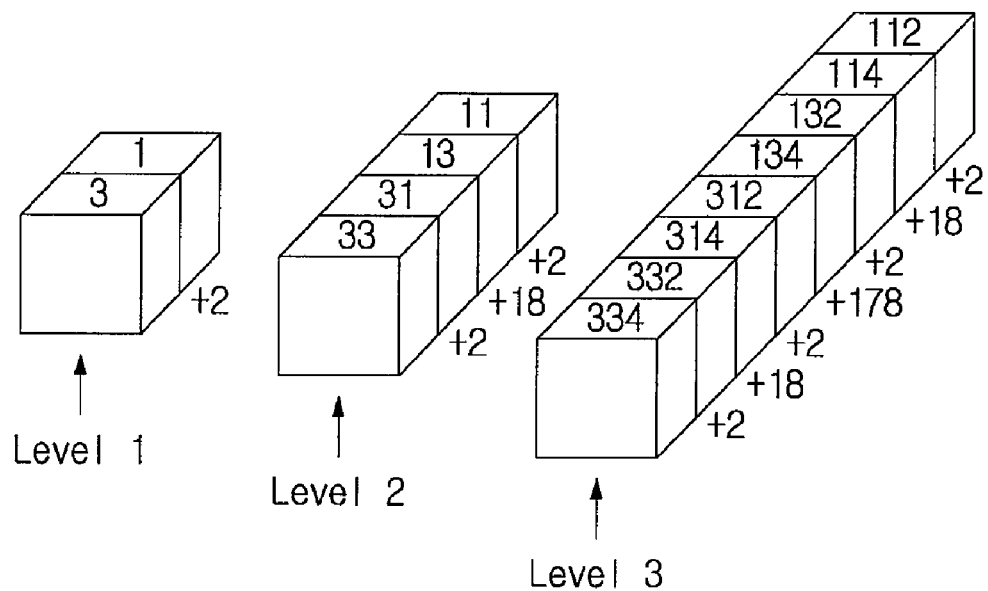
FIG. 7 shows the difference of the address values of neighboring cells in the z-axis per level in an octree structure to describe a sequential rule of the address difference value by an address encoding method according to an embodiment of the present invention.

FIG. 5 shows the difference of the address values of neighboring cells in the x-axis per level in an octree structure to describe a sequential rule of the address difference value by an address encoding method according to an embodiment of the present invention, and FIG. 6 shows the difference of the address values of neighboring cells in the y-axis per level in an octree structure to describe a sequential rule of the address difference value by an address encoding method according to an embodiment of the present invention. FIG. 7 shows the difference of the address values of neighboring cells in the z-axis per level in an octree structure to describe a sequential rule of the address difference value by an address encoding method according to an embodiment of the present invention.

As shown in FIG. 5 through FIG. 7, in accordance with the address encoding according to an embodiment of the present invention, the address difference values of the cells in the x-axis direction of the octree coordinate system can have the pattern of increase or decrease value that pertains to a set, $\{\pm1, \pm9, \pm89, \pm889, \pm8889, \ldots\}$. Here, the pattern of increase or decrease value, having a set of the address difference values of the neighboring cells in the x-axis, may be increased or decreased. Hereinafter, the set of the address difference values of the neighboring cells in the x-axis is referred to as the "pattern of increase or decrease value."

Similarly, a pattern of increase or decrease value in the y-axis direction can have a set, $\{\pm4, \pm36, \pm356, \pm3556, \pm35556, \ldots\}$ as shown in FIG. 6, and a pattern of increase or decrease value in the y-axis direction can have a set, $\{\pm2, \pm18, 1178, \pm1778, \pm17778, \ldots\}$ as shown in FIG. 7.

Here, the positive values indicate the increase direction of each axis, and the negative values indicate the decrease direction of each axis.

For example, as shown in FIG. 5, when the depth level is 1, the cells in the x-axis direction have the pattern of increase or decrease value of $\pm1$. When the depth level is 2, the cells have the pattern of increase or decrease value of $\pm1$ and $\pm9$. When the depth level is 3, the cells have the pattern of increase or decrease value of $\pm1$, $\pm9$ and $\pm89$.

Similarly, as shown in FIG. 6, when the depth level is 1, the cells in the y-axis direction have the pattern of increase or decrease value of $\pm4$. When the depth level is 2, the cells have the pattern of increase or decrease value of $\pm4$ and $\pm36$. When the depth level is 3, the cells have the pattern of increase or decrease value of $\pm4$, $\pm36$ and $\pm356$.

As shown in FIG. 7, when the depth level is 1, the cells in the z-axis direction have the pattern of increase or decrease value of ±2. When the depth level is 2, the cells have the pattern of increase or decrease value of ±2 and ±18. When the depth level is 3, the cells have the pattern of increase or decrease value of ±1, ±9 and ±89.

Described below are the properties of the above pattern of increase or decrease value.

The pattern of increase or decrease value of each axis can have positive values in an increase direction and negative values in a decrease direction. The maximum increase or decrease value may be not beyond the address length of the maximum depth level. In the same depth level, the increase or decrease value of the z axis may be two times greater than that of the x axis, the increase or decrease value of the y axis may be two times greater than that of the z axis and four times as much as that of the x axis.

This can be simplified and represented as the following formula 1.

The increase or decrease value $a_{n+1}$ of the pattern of increase or decrease value can be represented as the formula 1.

$$a_{n+1} = \pm(a_n + R_n), R_n = 8 \times a_0 \times 10^n \quad \text{[Formula 1]}$$

Here, $a_0$ refers to an initial value of the increase or decrease value and has 1 in the x axis, 4 in the y axis, and 2 in the axis. n refers to the maximum length of the neighboring cells that are arranged in a line according to each axis and is 0 or a natural number. For example, n is 0, a maximum natural number of the maximum depth level of the octree structure, or a natural number between 0 and the maximum natural number.

Described below is a method of searching the neighboring cells that are in contact by the surfaces, lines or corners with a randomly selected octree cell in the address-encoded octree structure.

Firstly, the properties of each axis can be analyzed by recognizing the sequential rule of the address difference values of each of the address-encoded octree cells.

As described through the description related to the encoding method, when the depth level is 1, two cells can be formed with respect to a root cell (e.g. a randomly selected cell) in the x, y, and directions, respectively. When the depth level is 2, four cells can be also formed in the x, y, and directions, respectively. When the depth level is 3, eight cells can be formed in the x, y, and directions, respectively.

Hereinafter, the x axis direction will be described in detail.

In the x axis, the difference 1 can be generated between the address values of two cells (in case that the depth level is 1, the pattern of increase or decrease value has ±1 in FIG. 5).

When the depth level is 2, four cells can be formed in one row. The differences 1 and 9 can be generated between the address values of each neighboring cells. The difference 1 can indicate the case that a tree is formed from one cell. The difference 9 can indicate that the depth level is decreased by two levels (refer to the level 2 in FIG. 5).

When the depth level is 3, eight cells can be formed in one row. The differences 1, 9, and 89 can be generated between the address values of each neighboring cells. The differences 1 and 9 can be generated by the above rule. The difference 89 can be generated between the neighboring cells having the difference 3 of the address values when the depth level is decreased by 3.

Similarly, the pattern of increase or decrease value in the x axis direction can have a set, {±1, ±9, ±89, ±889, ±8889, . . .}. The pattern of increase or decrease value of the y axis direction can have a set, {±4, ±36, ±356, ±3556, ±35556, . . .}. The pattern of increase or decrease value in the z axis direction can have a set, {±2, ±18, ±178, ±1778, ±17778, . . .}.

At this time, the number of the increase or decrease values of the pattern of increase or decrease values that can be represented as each set can be the same as that of the depth level of the octree structure.

For example, when the depth level is 1, the pattern of increase or decrease value of the x axis direction can have a set including the difference of the address difference value of 1. When the depth level is 2, the pattern of increase or decrease value can have a set including the differences of the address difference values of 1 and 9. When the depth level is 3, the pattern of increase or decrease value can have a set including the differences of the address difference values of 1, 9, and 89. In the case of the y axis, when the depth level is 1, the pattern of increase or decrease value can have a set including the difference of the address difference value of 4. When the depth level is 2, the pattern of increase or decrease value can have a set including the differences of the address difference values of 4 and 36. When the depth level is 3, the pattern of increase or decrease value can have a set including the differences of the address difference values of 4, 36, and 356. In the case of the z axis, when the depth level is 1, the pattern of increase or decrease value can have a set including the difference of the address difference values of 2. When the depth level is 2, the pattern of increase or decrease value can have a set including the differences of the address difference values of 2 and 18. When the depth level is 3, the pattern of increase or decrease value can have a set including the differences of the address difference values of 2, 18, and 178.

The pattern of increase or decrease value between the obtained x-, y-, and z-axes may be in multiples of one another. The increase or decrease value of the z axis may be two times greater than that of the x axis, the increase or decrease value of the y axis may be two times greater than that of the z axis and four times as much as that of the x axis.

Here, the increase or decrease values of each axis, which are the difference of the address values between the neighboring cells, can be described as the difference of address values.

As such, if the analysis of one axis is completed, it is possible to simply apply the completed analysis to the searching of another axis through the multiplication calculation.

Next, the property of an opposite pair in the address-encoded octree structure and a corresponding effective figure table of the opposite pair will be described.

For example, when the depth level is 4 and an octree cell having the address value of 1146 is selected, as shown in the following table 1, an address value table according to the increase or decrease values can be obtained by adding in the increase direction or subtracting in the decrease direction the aforementioned pattern of increase or decrease value.

TABLE 1

|    | level 1 Increase or decrease value Address value | level 2 Increase or decrease value Address value | Level 3 Increase or decrease value Address value | level 4 Increase or decrease value Address value |
|----|------|------|------|------|
| x1 | −1   | −9   | −89  | −889 |
|    | (1145) | 1137 | 1057 | 257 |
| x2 | 1    | 9    | 89   | 889 |
|    | 1147 | 1155 | (1235) | 2035 |
| y1 | −4   | −36  | −356 | −3556 |
|    | (1142) | 1110 | 810  | −2410 |
| y2 | 4    | 36   | 356  | 3556 |
|    | 1150 | (1182) | 1502 | 4072 |

TABLE 1-continued

|  | level 1 Increase or decrease value Address value | level 2 Increase or decrease value Address value | Level 3 Increase or decrease value Address value | level 4 Increase or decrease value Address value |
|---|---|---|---|---|
| z1 | −2 | −18 | −178 | −1778 |
|  | 1144 | (1128) | 968 | −632 |
| z2 | 2 | 18 | 178 | 1778 |
|  | (1148) | 1164 | 1324 | 2924 |

As shown in the table 1, in the case of the depth level of 4, the available increase or decrease values can be 1, 9, 89, and 889 in the x-axis. All of the values can be added or subtracted. Similarly, an address value table according to the increase or decrease values of the y- and z-axes similar to the table 1 can be obtained by adding or subtracting the pattern of increase or decrease value. As a result, four address values can be created in each direction.

In the table 1, the figure in the parentheses can be an address value of an actual effective neighboring cell. The address value of the effective neighboring cell can be determined through the 4 following basic rules and the following effective figure table of table 2.

It may be required to use the 4 basic rules in order to determine whether or not the address of the neighboring cell is effective from the address value of a randomly selected cell.

1. It may be impossible to use a negative, 0 and 9 for an address value because the address encoding is performed by using the figures of 1 through 8.

2. The length of the addresses of the cells having the same depth level may be identical to each other.

3. The figures in the last digits of neighboring cells may not be identical to each other.

4. Only figures in the effective figure table may be available for each digit of addresses.

On the other hand, the fourth rule may need an effective figure table of the opposite pair as shown in the following table 2. This effective figure table shows the rule to which the address encoding method according to an embodiment of the present invention is applied identically. For example, when 1 is selected, if the address is moved in the x axis and the increase or decrease direction, the address value is 2. Similarly to the y- and z-axis, the address value must be 5 and 3, respectively, to satisfy the neighboring condition.

As a result, the table of available figures for all figures can be obtained. The same figures can be located at any digits of the address values of the neighboring cells. However, the figures in the last digits may not be identical to each other.

TABLE 2

| FIG. | all | X | y | z |
|---|---|---|---|---|
| 1 | 1 | 2 | 5 | 3 |
| 2 | 2 | 1 | 6 | 4 |
| 3 | 3 | 4 | 7 | 1 |
| 4 | 4 | 3 | 8 | 2 |
| 5 | 5 | 6 | 1 | 7 |
| 6 | 6 | 5 | 2 | 8 |
| 7 | 7 | 8 | 3 | 5 |
| 8 | 8 | 7 | 4 | 6 |

Figure 8:
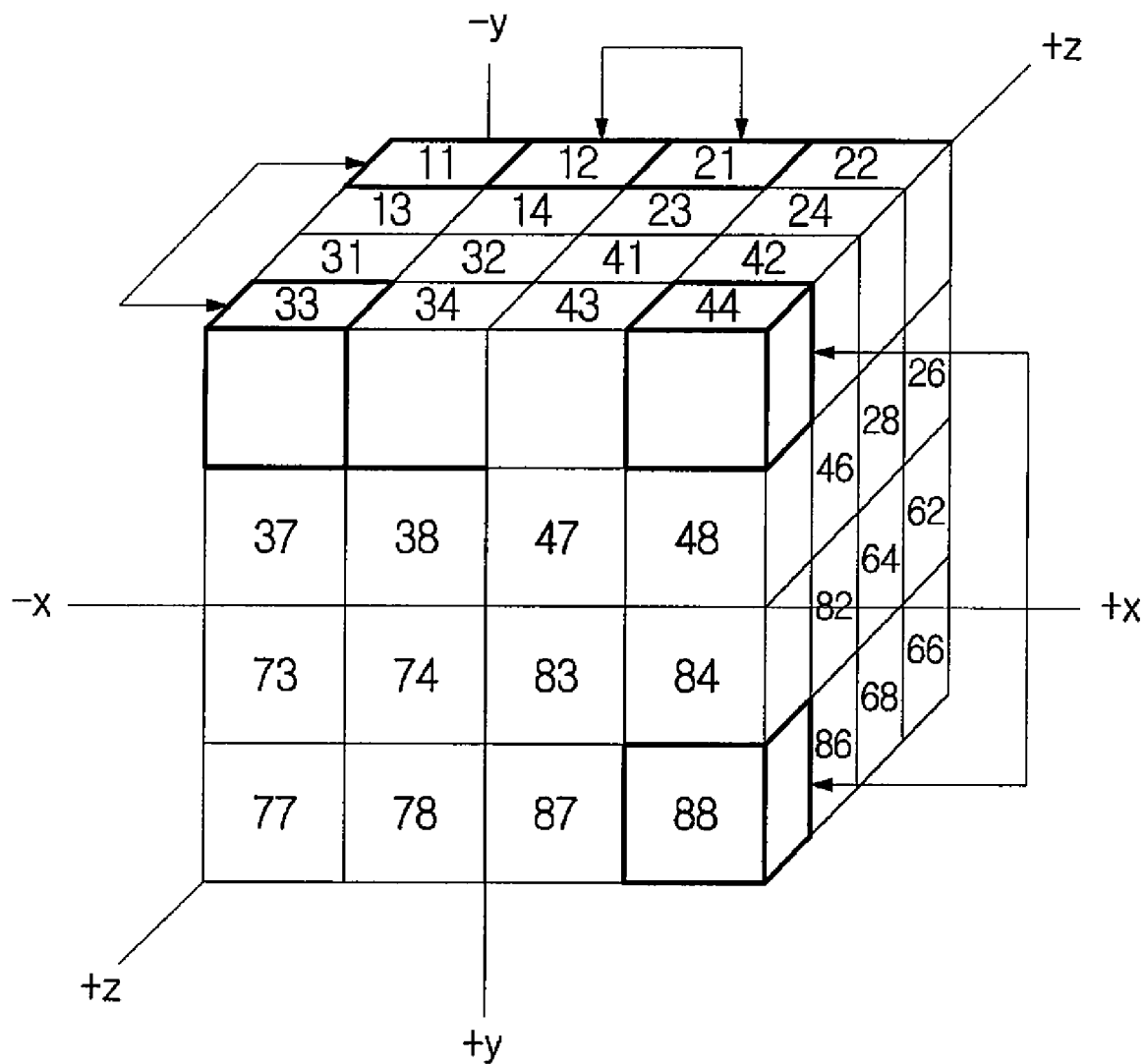
FIG. 8 shows an octree cell at a depth level 2 in an octree coordinate system, which has been address-encoded in an address search method according to an embodiment of the present invention.

FIG. 8 shows an octree cell at a depth level 2 in an octree coordinate system, which has been address-encoded in an address search method according to an embodiment of the present invention.

If the coordinate system of x-, y-, and z-axes is formed from the center of a root cell, the boundaries can be formed between the axes. When the coordinate system is fold in half in the x-, y-, and z-axes, respectively, according to each boundary, the address values of the octree cells located opposite to each other about each axis as shown in FIG. 8.

As shown in FIG. 8, the address values of two octree cells that are located opposite to each other have different values but make a pair as if they are mirrored. Here, the mirror neighboring of address values can be obtained through the table 2.

As shown in FIGS. 8, 11 and 22, and 12 and 21 in the x-axis are good examples.

The summation of the address values of two cells having the property of opposite pair may be regular from each row or column. For example, 11+22=33 and 12+21=33 in the x-axis. That is, the summations of all the two cells that are located opposite to each other may be regular. In the y- and z-axis, the same principle can be applied.

This can means that the figures are regularly changed in each axis direction. For example, when a cell is randomly selected, if 1 is selected for the last digit of an address, the last digit of the address of a pertinent neighboring cell should have 2. Inversely, if 2 is selected, the last digit of the address should have 1. As a result, if 1 is selected, it is possible to obtain a figure that the neighboring cell in the x-, y-, and z-axis, respectively, should have. This can be represented as the effective figure table of an opposite cell of the above table 2.

Next, the normalization of address values can be performed.

It is possible to obtain the cells that are located opposite to the randomly selected octree cell about the xy, yz, and zx boundaries of each axis as opposite pairs. At this time, the signs of the points at which the cell is located are opposite to each other. The normalization of the address of the randomly selected cell according to the octree depth level can be performed by using the difference between the address values the two cells.

Figure 9:
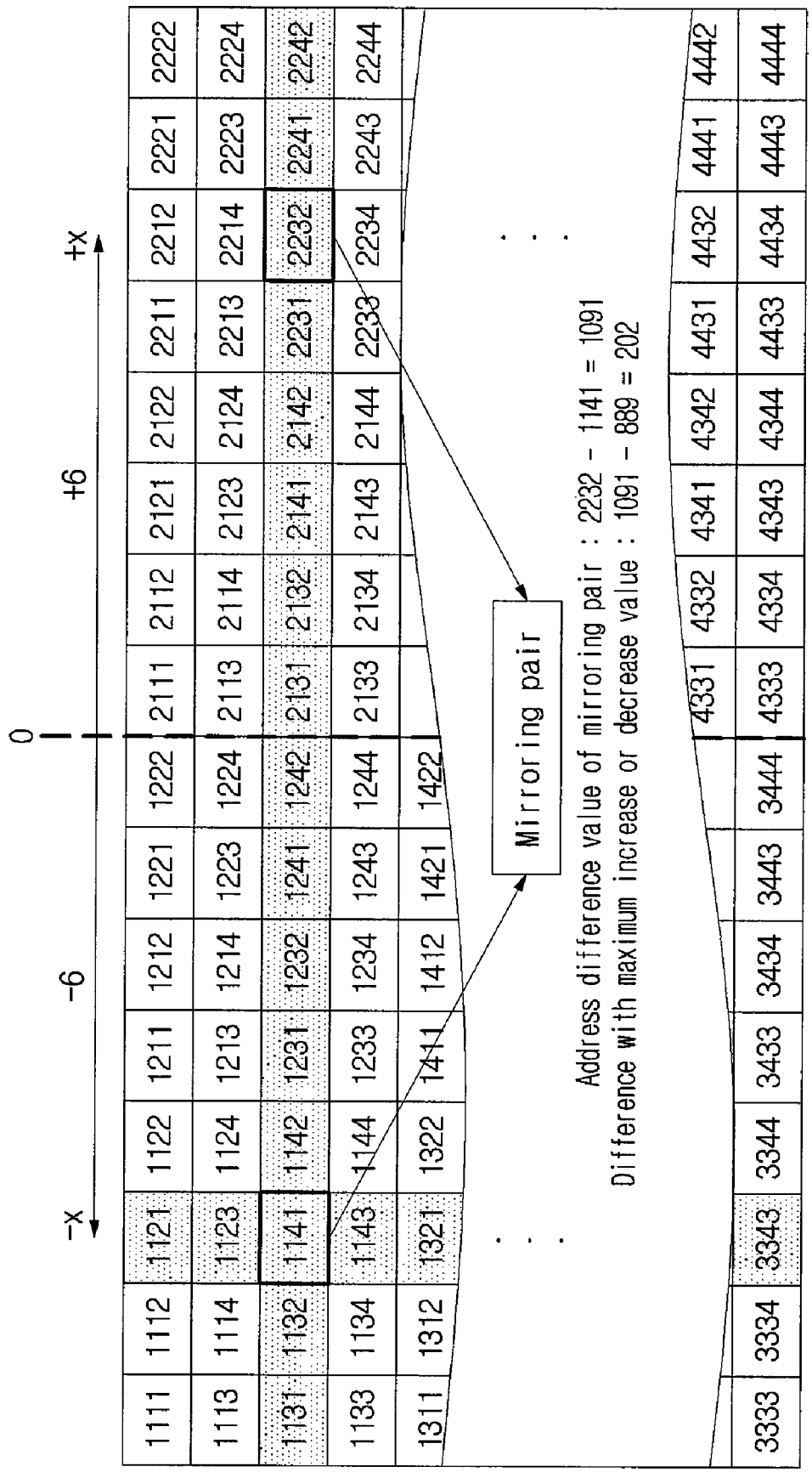
FIG. 9 shows some of address values of an octree cell at a depth level 4 when viewed from a front side.

FIG. 9 shows some of address values of an octree cell at a depth level 4 when viewed from a front side. An example of the address normalization is shown in FIG. 9.

For example, it is assumed that a cell of 1141 is selected to obtain a normalized value in an x-axis as shown in FIG. 9. The address value of a cell that is opposite to the cell of 1141 is 2232. This value of 2232 can be very easily obtained from the effective figure table of an opposite cell of the table 2.

The address difference value of the opposite pair can be evaluated by subtracting 1141 from 2232. The evaluated address difference value is 1091 as shown in FIG. 9. This value 1091 is the address difference value of the two cells that are 6 cells distant in left and right directions, respectively, from the center of the x-axis.

In aforementioned increase or decrease pattern, the address value of 1141, having the digits of 4 or the depth level of 4, can have the maximum increase or decrease value of 889 in the axis.

If the difference value, 202, between the address difference values of the opposite pair 1091 and the maximum increase or decrease value 889 is obtained, the obtained address values can be normalized to the greatest value of the address difference values.

The difference value between the x-, y-, and z-axes can be in multiples of one another. Similarly to the property of the increase or decrease value, there is the difference value of the multiple of 2 in each axis. Accordingly, if the x-, y-, and z-axes are divided by 2, 8, and 4 respectively, it is possible to obtain the commonly normalized address value 101 in each axis.

Since the normalized address value is directly used as a binary number, if the binary number is converted to a decimal number, the decimal number can becomes a location coordinate value which shows how much distant a pertinent cell is from the origin in each axis.

Like the example of FIG. 9, the normalized address value of a cell of 1242 is 000. The decimal value to which the binary value of 000 is converted is 0. This indicates that the cell is 0 distant in the x-axis from the origin.

For another example, the normalized address value of a cell of 1141 is 101. The decimal value to which the binary value of 101 is converted is 5. This indicates that the cell is 5 distant in the x-axis from the origin.

An identity value can be computed by evaluating a great common divisor of the decimally converted normalized address value and the maximum number of octree cells that is generated from one line of each axis in each depth level. Here, the identity value is a value related to the order capable of identifying which pattern is to be used in the pattern of increase or decrease value in the positive axis.

For example, the normalized address value of the cell of 1141 is 101 as described above. The decimal value to which the binary value of 101 is converted is 5. The cell corresponding to the digits of an address of 4 is a cell in the octree structure. Accordingly, there can be 16 cells in a line at the maximum. The great common divisor between 5 and 16 is 1.1 is 20. Thus, the identify value is 0.

In the pattern of increase or decrease value in the x-axis, the increase or decrease value can be represented by using an like the formula 1. If so, a0 is 1, which is a first increase or decrease value in the x-axis-directional pattern of increase or decrease value. A predetermined increase or decrease value can be acquired in the pattern of increase or decrease value by using the identity value.

For another example, the normalized address value of a cell of 1142 is 100. The decimal value to which the binary value of 100 is converted is 4.

In particular, the address value of a cell that is opposite to the cell of 1142 is 2231. The corresponding address difference value is 1089. The difference value is evaluated as 200 by subtracting the maximum increase or decrease value 889 of the level 4 from 1089. Here, if 200 is divided by 2 because of the x-axis, the normalized address value is 100. The decimal value to which the binary value of 100 is converted is 4.

Similarly, the maximum common divisor of 4 and 16 is 4.4 is 22. In this case, the identity value is 2. In the x-axis dimensional pattern of increase or decrease value, a third increase or decrease value, a2, is 89.

Through the identity value, it is possible to recognize which increase or decrease value is available in the pattern of increase or decrease value.

The difference value between a decimal value corresponding to the normalized address value, used when an increase-directional increase or decrease value is evaluated, and the half value, evaluated by dividing the number of octree cells capable of being generated in a line in one direction in a depth level by 2 can be computed to evaluate the decrease-directional increase or decrease value. The identity value can be computed by a greatest common divisor of the computed difference value and the number of the octree cells.

For example, the decimal value corresponding to the normalized address value of the cell of 1141 is 5, and the increase-directional increase or decrease value is 1 as described above. In the level 4, 16 cells can be generated in one direction. Accordingly, 8 can be obtained by dividing 16 in half. Here, it is noted that since the identity value is used from 0, the half value is 7. The difference value between the normalized address value 5 and the half value 7 is 2. The greatest common divisor of 2 and 16 is 2. Since 2 is 21, the identity value in the decrease direction is 1. In the pattern of increase or decrease value, a second increase or decrease value corresponding to the identity value 1 is 9. Thus, a decrease (i.e. −x)-directional increase or value is −9.

There can be two exceptional cases when the address difference value is evaluated in case that each selected cell is located at the last boundary. In this case, the address difference value can be evaluated by increasing or decreasing no value.

If 6 fundamental neighboring cells are finally obtained through all the aforementioned processes, the remaining 20 address values can be simply obtained through the combinations of 2 or 3 address difference values.

FIG. 10 is an example showing how address values of 20 neighboring cells that are in contact by the lines and the corners are generated. As shown in FIG. 10, If any two are obtained from −x, +x, −y, +y, −z, and +z without redundant selection, a total of 12 combinations of the neighboring cells that are in contact by the lines. If any three are obtained, a total of 12 combinations of the neighboring cells that are in contact by the corners. Accordingly, the address values of the remaining cells except for the 6 fundamental neighboring cells can be obtained.

That is, if the address values of the 6 fundamental neighboring cells or the difference value between the address values of the neighboring cells are obtained, the address values of the 12 cells (2 connection model) that are in contact by the lines and the 8 cells (3 connection model) that are in contact by the corners can be easily obtained through the summation of the increase or decrease values of cells.

For example, an octree cell having the address value of 1146, as shown in FIG. 10, can have a final increase or decrease value that is identical to that of the red octree cell. The cell located at the front and lower side is the 2 connection model that is in contact by the lines. +z and +y values can be used for the increase or decrease value of address. The values are 2 and 3, and their summation is 38. Accordingly, the address value, 1184, of a new neighboring cell can be obtained by adding the increase or decrease value of 38 into the address value of 1146.

As a result, the address values of the cells in all of the 20 directions can be easily obtained. Here, if there is an increase or decrease value 0 among the 6 fundamental directions, the value 0 corresponds to the boundary. Accordingly, if there is an increase or decrease value of 0, the address value can be determined as 0.

Although some embodiments of the present invention have been described, anyone of ordinary skill in the art to which the invention pertains should be able to understand that a very large number of permutations are possible without departing the spirit and scope of the present invention and its equivalents, which shall only be defined by the claims appended below.

What is claimed is:

1. A method of searching an address value of a neighboring cell that is in contact with a randomly selected octree cell in an octree structure cell, the method comprising steps to be executed by a processor configured to process data, wherein the steps comprise:

performing address encoding of octree cells by giving an inherent address value that is increased according to a depth level of octree to each cell in the octree structure such that address difference values of neighboring cells in the octree structure have a sequential rule, wherein an address is given by assigning positive integers of 1 through 8 from an upper left rear corner of an octree cell and repeatedly increasing the number of digits according to the depth level of octree and adding a new digit at the end of an old address, and wherein the sequential rule includes selecting the address difference values of neighboring cells from a predetermined set of numbers, the size of the predetermined set being based on the depth level of the neighboring cells; and searching an address value of a neighboring cell that is in contact by a surface with the selected octree cell by using the sequential rule based on the address difference values, wherein, in the searching of the address value of a neighboring cell, a searching of address values of neighboring cells that are in contact by surfaces of 6 directions of an octree coordinate system is performed by steps that comprise:

normalizing a difference value with respect to each axis of the octree coordinate system between address values of the selected octree cell and a cell that is opposite, with respect to a selected axis of the octree coordinate system, to the selected octree cell as a coordinate value of the selected octree cell from a center of the octree coordinate system, wherein an address value of the cell that is opposite to the selected octree cell, with respect to the selected axis, is determined by finding a corresponding digit for each digit of the address value of the selected octree cell based on a lookup table, and wherein the normalizing comprises (a) determining a further difference value between the difference value with respect to each axis and a maximum address difference value between the selected cell and its neighboring cells, (b) acquiring in binary representation a normalized address coordinate with respect to the selected axis by dividing the further difference value by a base number that is associated with the selected axis, and (c) acquiring a decimal coordinate of the selected cell with respect to the selected axis by converting the binary representation of the normalized address coordinate with respect to the selected axis from a binary representation to a decimal representation;

determining an identity value based on the decimal coordinate of the selected cell with respect to the selected axis; and determining address values of neighboring cells of the selected cell with respect to the selected axis based on the identity value.

2. The method of claim 1, further comprising: searching an address value of a neighboring cell that is in contact by a line or a corner with the selected octree cell.

3. The method of claim 2, wherein, in the performing of the address encoding of octree cells, the address encoding is performed by using an octree coordinate system having an origin which is a center of gravity of an octree cell and an x-axis in left and right directions, a y-axis in upper and lower directions, and a z-axis in front and rear directions such that the addresses values given to the neighboring cells in the octree structure have directions based on the x, y, z axes of the octree coordinate system.

4. The method of claim 3, wherein the searching of the address value of a neighboring cell is performed by using a sequential rule that a summation of address values of two octree cells that are located opposite to each other about each of the x-, y-, and z-axes from a center in the octree coordinate system is regular.

5. The method of claim 4, wherein the searching of the address value of a neighboring cell is performed by using 4 basic rules, for determining whether an address value of a neighboring cell is effective, and by using an effective figure table of opposite cell that stores an effective figure capable of regularly replacing an address value of an octree cell located at an opposite point, whereas the 4 basic rules include a first condition, using positive integers of 1 through 8 for address-encoding; a second condition, requiring that lengths of addresses are identical to each other; a third condition, requiring that figures in the last digits are not identical to each other; and a fourth condition, requiring that figures in the effective figure table are available for each digit of addresses.

6. The method of claim 1, wherein, in the performing of the address encoding of octree cells, the address encoding is performed by a method that increases the depth level of octree by maximizing the size of a first octree cell and continuously dividing the cell into smaller cells.

7. The method of claim 1, wherein, the octree coordinate system has an origin which is a center of gravity of an octree cell and an x-axis in left and right directions, a y-axis in upper and lower directions, and a z-axis in front and rear directions, and the sequential rule of address difference values of neighboring cells in the octree structure has a pattern of increase or decrease value that pertains to one of a set of increase or decrease values of address difference values of cells in an x-axis direction, $\{\pm 1, \pm 9, \pm 89, \pm 889, \pm 8889, \ldots\}$; a set of increase or decrease values of address difference values of cells in a y-axis direction, $\{\pm 4, \pm 36, \pm 356, \pm 3556, \pm 35556, \ldots\}$; and a set of increase or decrease values of address difference values of cells in a z-axis direction, $\{\pm 2, \pm 18, \pm 178, \pm 1778, \pm 17778, \ldots\}$, whereas a positive value indicates an increase direction of each axis, and a negative value indicates a decrease direction of each axis.

8. The method of claim 7, wherein the increase or decrease values $a_{n+1}$ of address difference values are generalized as $a_{n+1} = \pm(a_n + R_n)$, $R_n = 8 \times a_0 \times 10^n$, whereas $a_0$, which is an initial value of the increase or decrease values of address difference values, has 1 in the x-axis, 4 in the y-axis, and 2 in the z-axis, n, which is a maximum length of the neighboring cells being arranged in a line in each axis direction, ranges between 0 and a maximum depth level of octree.

* * * * *